United States Patent [19]

Betts et al.

[11] Patent Number: 4,669,090
[45] Date of Patent: May 26, 1987

[54] HALF-DUPLEX MODEM WITHOUT TURNAROUND DELAY

[75] Inventors: William L. Betts, St. Petersburgh; Kenneth Martinez, Pinellas Park, both of Fla.

[73] Assignee: Paradyne Corporation, Largo, Fla.

[21] Appl. No.: 752,402

[22] Filed: Jul. 5, 1985

[51] Int. Cl.⁴ ............................................. H04B 1/38
[52] U.S. Cl. ........................................ 375/8; 375/13; 455/70
[58] Field of Search .................. 375/7, 8, 13; 455/70; 370/94

[56] References Cited

U.S. PATENT DOCUMENTS 4,044,307  8/1977  Borysiewicz et al. .................. 375/8
4,241,398  12/1980  Carll ......................................... 375/7

Primary Examiner—Robert L. Griffin
Assistant Examiner—Raymond C. Glenny
Attorney, Agent, or Firm—Kane, Dalsimer, Kane, Sullivan & Kurucz

[57] ABSTRACT

A modem is operated in a half-duplex mode having various elements which are trained on data and which are locked up while data is not exchanged, thereby eliminating the need for a preamble. A preamble is used only if the period between successive transmissions exceeds a preselected threshold.

5 Claims, 3 Drawing Figures

HALF-DUPLEX MODEM WITHOUT TURNAROUND DELAY

BACKGROUND OF THE INVENTION

1. Field of the Invention

This invention pertains to a modem which may be operated in a half-duplex mode to exchange digital data over two-wire circuits without the need of a preamble prior to each data transmission. Therefore as soon as the modem stops transmitting it is instantaneously ready to receive data.

2. Description of the Prior Art

Conventional half-duplex modems are used to operate two-wire leased or dial telephone circuits. Two-wire circuits require transmission in only one direction at a time unless costly, non-ideal band splitting or echo cancellation techniques are employed. These non-ideal techniques induce impairments which necessarily limit the highest possible transmission rate.

Half-duplex modems which transmit data in only one direction at a time are not limited by these impairments. They can transmit at a higher data rate. At the highest possible data rate, complex receivers are required. These receivers have many adaptive functions, including gain control, carrier recovery, timing recovery, frequency offset compensation, adaptive automatic equalizers, and data randomizers. All of these functions require time to initialize which significantly delays the start of transmission.

Before transmitting data, a terminal first sends a Request-to-Send, RTS, signal to its modem. Data transmission is not allowed, however, until the modem returns a Clear-to-Send (CTS) signal. The period between RTS and CTS is defined here as the CTS delay. During this time, special sequences are transmitted which allow the remote receiver to train all of its adaptive functions. These adaptive functions are reset prior to each transmission. As the modem's data rate increases, the CTS delay increases. For example, for a 2400 bps modem, the delay is 8 ms, for a 4800 bps modem the delay is 50 ms, and for a 9600 bps modem the delay is 253 ms.

OBJECTIVES AND SUMMARY OF THE INVENTION

A principal objective of the present invention is to provide a half-duplex modem in which training prior to each transmission is unnecessary thereby eliminating the CTS delay and increasing the amount of data transmitted and received by the modem.

According to the present invention, a modem is adapted to memorize or freeze the communications system impairment information after each transmission. At the next transmission it is assumed that the impairment information correlated during the last transmission is still correct and therefore data is transmitted without a training preamble. In effect the modem accumulates impairment information over all previous transmissions. After a call is established, each modem transmits a long preamble to establish signal level, carrier frequency/phase, timing frequency/phase, adaptive equalizer setting, and de-randomizer setting. All subsequent transmissions do not utilize a preamble, but continuously train-on-data. Significant performance improvement is realized over conventional modems, which completely retrain on each transmission. In effect, two conventional modems operated in a half duplex mode for two hours, have a total of one hour each of training time. In comparison, a modem operated in half-duplex mode in accordance with this invention has only 20 ms of training time. Conventional modems perform as poorly on their last transmission as their first.

As a result of this mode of operation, the period of time that VF energy is actually on the line will exceed "CTS On" time by no more than the specified CTS delay plus filter ringing time of a few milliseconds. The filter ringing is an inherent physical characteristic of the system.

Zero CTS delay is achieved by controlling (or flywheeling) all of the adaptive receiver functions in such a manner that exact recovery occurs when the line is turned around. Some of the significant features of a typical modem that allow for zero CTS are listed below.

1. Carrier Detect After Equalization. The Carrier Detect function is implemented at the output of the adaptive equalizer. This is very significant because the adaptive equalizer eliminates ringing. The origin of the signal space constellation is considered as a valid point which indicates that Carrier Detect is off.

2. Digital Implementation. The modem is implemented in a microprocessor using all digital circuitry. Digital circuitry enables all functions to be quantized and maintained for the duration of the Carrier Detect off time. When carrier reappears, then all functions can begin on exactly the same baud interval with no change from the previous baud when carrier was off.

3. Data Randomizer. The transmitter incorporates a randomizer which is used to randomize the data so that the adaptive equalizer can function. This randomizer is locked whenever Clear-to-Send is turned off in the transmitter. Correspondingly, the derandomizer in the receiver is locked whenever Carrier Detect is off. The locked feature enables random data to appear on the very first baud of each transmission so that the equalizer can continuously adapt even on the first baud. Previous implementations would preset the randomizer which caused a fixed pattern during any short message. The fixed pattern would lock up an adaptive equalizer and prohibits continuous adaptation, except after a long message.

4. Timers. Timers are incorporated in the transmitter and the receiver and indicate which preamble is to be sent. If the transmitter is off for no more than 1.7 seconds, then the CTS delay can be zero with no preamble. However, if the transmitter is out for a longer duration, then the received baud timing circuitry or carrier phase may drift too far to be reacquired on the first baud interval. When CTS turns off, the timer in the transmitter is initialized and if the timer expires before RTS again reappears, then a long preamble will be sent. The preamble length can be adapted to the duration for which the transmitter was off. The receiver has a corresponding timer that indicates the duration the Carrier Detect is off. If carrier has been off for 1.7 seconds, then it can be assumed that the transmitter will be sending a preamble sequence. However, patterns within the sequence can be used to indicate the actual duration of the sequence.

5. Carrier Detect Holdoff. A single microprocessor is used to implement transmit and receive functions and any memory locations in the processor can be accessed by either transmitter or receiver. When the transmitter is in any state other than the WAIT state, the receiver Carrier Detect, CD, is disabled. A timer is used to continue the Carrier Detect holdoff a duration equal to the length of the adaptive equalizer. It can be assumed that in the remote receiver, when the local transmitter turns off, the final symbols will not appear at the output of the remote receiver for the duration of the adaptive equalizer delay at that remote end. Therefore, the holdoff at the local receiver will not add any additional delay to the half-duplex transmission. The purpose of this holdoff is so that the ring-down signal of the transmitter will not be detected in the local adaptive equalizer. This delay can be extended to equal the total end-to-end delay with no reduction in through-put. A longer delay is desirable to prevent remote echos of the local transmitter from activating the receiver Carrier Detect. The adaptive equalizer compensates for the remote transmitter ring down but not the local transmitter ring down and echo.

6. RTS Holdoff. The receiver is enabled only when the transmitter is in an IDLE or WAIT state. While in this state, the transmitter monitors the receiver Carrier Detect. If the Carrier Detect is active, then the transmitter is not allowed to leave the WAIT state. RTS and CTS will be held off. The transmitter can not be activated until the received message terminates and Carrier Detect turns off. The only possible ambiguity is when a signal has entered the receiver adaptive equalizer but has not yet been detected at the output of the equalizer such that Carrier Detect is still off.

7. Analog Carrier Detection. A level threshold detector can be implemented at the input to the adaptive equalizer. This detector can be used to inhibit the transmitter if a signal above the threshold level is detected. This will prevent the transmitter from turning on prior to a signal propagating through the equalizer where it will be detected by the Carrier Detect at the output of the adaptive equalizer. Noise which may activate the simple threshold detector will not disrupt any transmission. The equalizer Carrier Detector and the analog carrier detector are only monitored by the transmitter when it is in the WAIT state. If the Carrier Detectors are actually off, then the transmitter will leave the WAIT state and the receiver will be disabled.

8. Transmission Delay. Transmission delays through the modems and the communications lines are a significant part of the turnaround delay. This delay is made up of primarily the transmission channel, adaptive equalizer, transmit filters, buffering and other implementation delays. The communications channel itself may provide delay up to around 80 ms with several hundred milliseconds of delay if a satellite link is involved. By using zero Clear-to-Send delay, i.e., no preamble in the transmitter, the data throughput is maximum.

BRIEF DESCRIPTION OF THE INVENTION

DETAILED DESCRIPTION OF THE INVENTION

Figure 1:
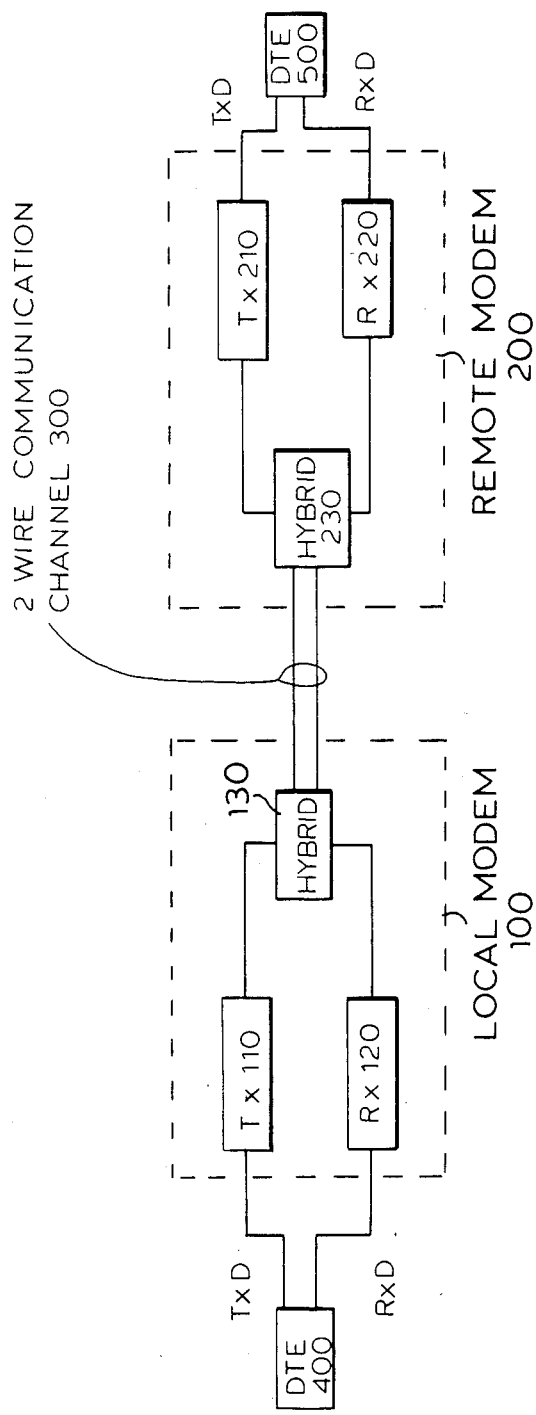
FIG. 1 shows a schematic diagram of a half-duplex communication system modem constructed in accordance with this invention.

In reference now to FIG. 1, a local modem 100 is connected to a remote modem 200 through a two-wire communication channel 300 for exchanging data between DTE's (data terminal equipments) 400 and 500 using Quadrature Amplitude Modulation respectively. Each modem includes as usual, a transmit sections 110, 210 and receive sections 120, 220. In addition each modem also includes a hybrid interface circuit 130, 230.

Figure 2:
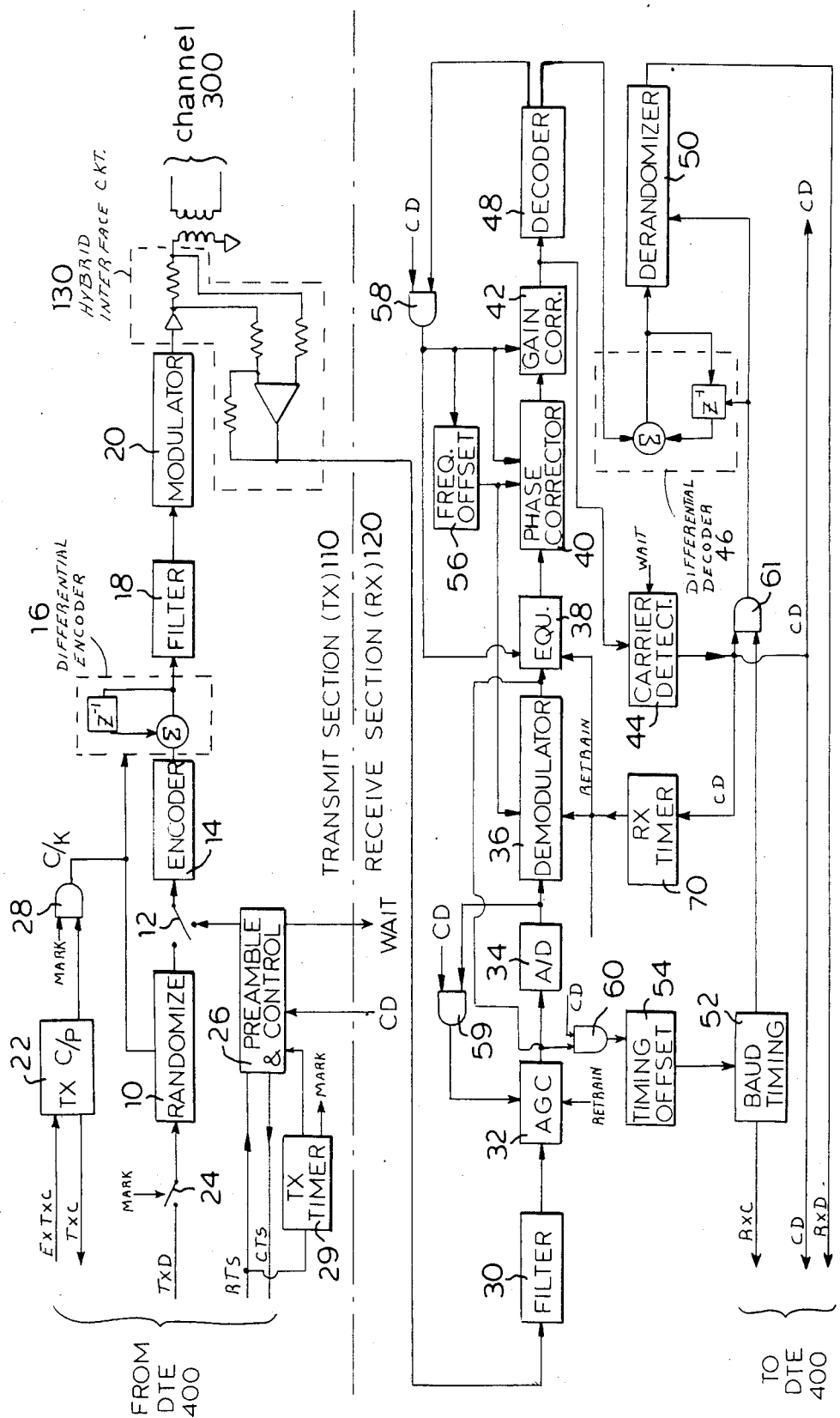
FIG. 2 shows the major components of one of the modem of FIG. 1.

As shown in more detail in FIG. 2, the transmitter section 110 of a local modem 100 may comprise a randomizer 10, a selector switch 12, an encoder 14, a differential encoder 16, filter 18 and modulator 20. The transmitter section may further include a transmitter clock generator (TXC/K) circuit 22, a randomizer input switch 24, and a preamble generator and control circuit 26 and a timer 29 for monitoring the time interval between successive RTS signals from DTE 400.

The transmitter section 110 operates as follows. Data transmission is initiated by DTE 400 by sending an RTS (request-to-send) signal at t=T1 (See FIG. 3) to circuit 26. For the first data transmission, circuit 26 generates a sequence consisting of a plurality of training and initializing signals. During this period selector switch 12 is set to accept signals from circuit 26 whereby the preamble sequence propagates through circuits 14, 16, 18, and 20 to hybrid interface circuit 130 for transmission over channel 300. At t=T2 the preamble sequence is completed, selector switch 12 flips over to accept data from randomizer 10 and the circuit 26 sends a CTS (clear-to-send) signal back to DTE 400 indicating that it is ready to accept data. The circuit 26 also generates an internal MARK signal which coincides with the CTS signal, and a WAIT signal. The WAIT signal is used to disable selective portions of the receiver section 120 as described more fully below.

The transmitter clock generator 22 generates clock signals which may be synchronized by an external signal (ExTxc). The clock signals are fed to a gate 28 which is enabled by the MARK signal as shown. The output of gate 28 is used to provide periodic clock signals (c/k) to randomizer 10, and differential encoder 16.

Figure 3:
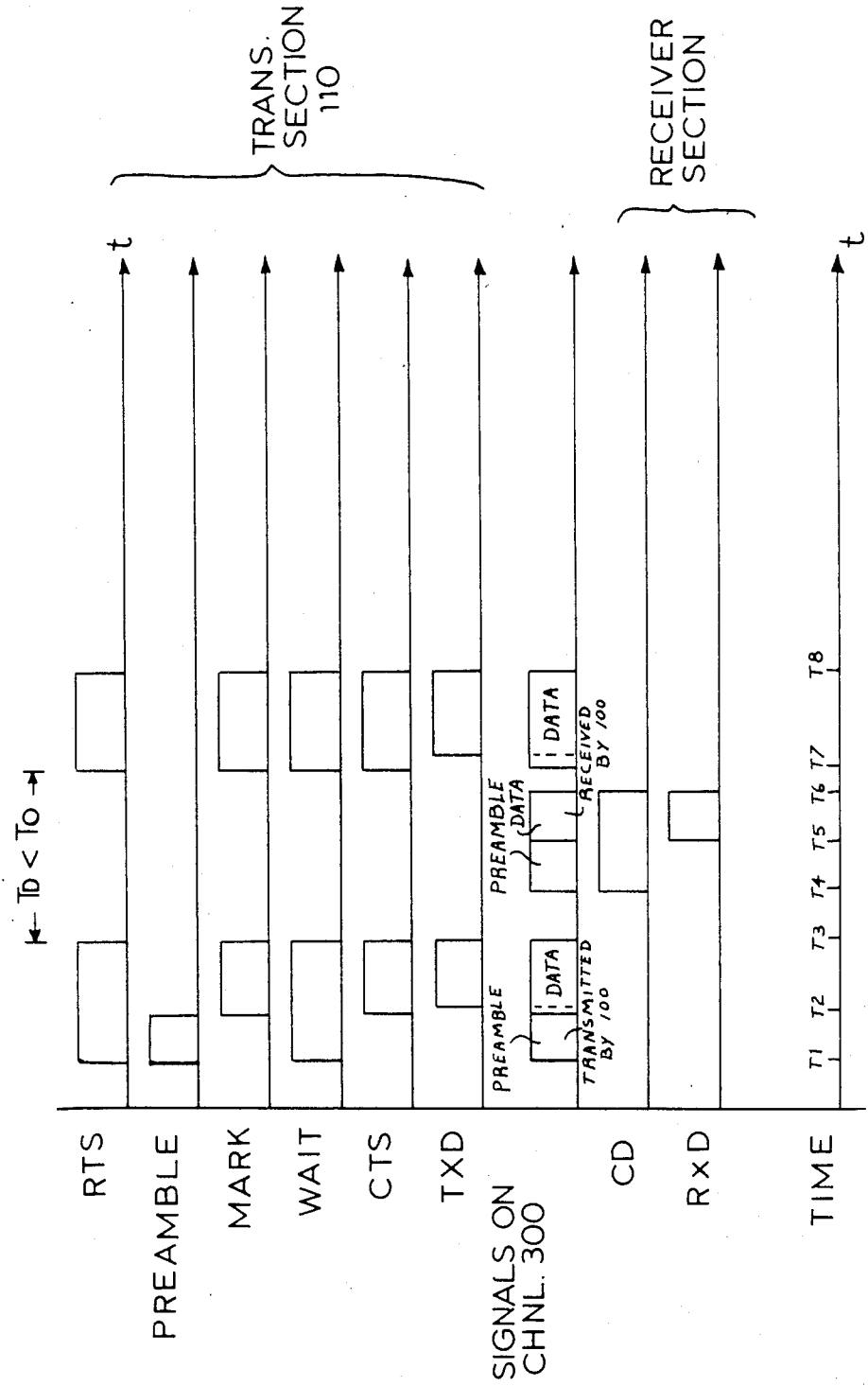
FIG. 3 shows the various control and data signals within one of the modems of FIG. 1 as a function of time.

The MARK signal is also used to close randomizer input switch 24 for accepting data from DTE 400. After CTS goes high, DTE starts sending data on line TXD. This data is used to generate transmitter section output signals by the randomizer, encoder, differential encoder and modulator in the normal manner as shown in FIG. 3. There is a delay equal to 1-4 bit periods between the time CTS goes HIGH and that the data bits are received from DTE 400. Therefore, the first one or two bauds output from the transmitter indicating that data bits have not yet been received correspond to the origin of the QAM constellation. At t=T3, RTS goes low indicating the end of data transmission. In response, the CTS and MARK signals go LOW putting the transmission section in an idle mode.

Importantly, the clock signals to randomizer 10 and differential encoder 16 are also stopped and since these transmitter elements contain memory means for storing data any data signals contained therein are not erased.

Receiver section 120 comprises, in series, filter 30, AGC (automatic gain control) circuit 32, A/D circuit 34, demodulator 36, equalizer 38, phase corrector circuit 40, gain corrector circuit 42, carrier detector 44, differential decoder 46, decoder 48, and derandomizer 50. The derandomizer 50, decoders 48 and 46, and demodulator 36 are complementary to randomizer 10, encoders 14, 16, and modulator 18 respectively. The remaining elements of the receiver section are well known in the art.

The receiver section further includes a baud timing circuit 52, which is synchronized to the received signals by a timing offset circuit 54. There is also a frequency offset circuit 56 used to eliminate errors due to frequency offset. The operational parameters of the receiver are dynamically adjusted while signals are received. Furthermore, it should be appreciated that the above-described receiver elements may include memory means for storing either the above-mentioned operational parameters, or previously received data signals.

The receiver section 120 operates as follows.

Sometime after the transmitter section has gone into its idle mode, such as at t=T4, an initial signal sequence may be received from remote modem 200. This sequence may include a preamble as well as data. The preamble sequence is used by the receiver to calculate and initialize the operational parameters. At t=T5 the preamble sequence is complete and data reception begins. The receiver decodes the data signals in the usual manner and sends them to DTE 500 over the RXD line. The data reception ends at t=T6 at which time the CD signal goes LOW.

Since the same pair of lines are used to transmit and receive signals, means are needed to disable the receiver section while the transmitter is operational. This function is accomplished by the WAIT signal generated by the control circuit 26 of the transmitter section. As shown in FIG. 2, the WAIT signal is fed to the carrier detector circuit 44 and is used to disable its output while the WAIT signal is HIGH. The output of baud timing circuit 52 is fed to a gate 61 which is controlled by the output of the carrier detector circuit 44. The output of gate 61 is used as a clock signal (c/k) to the differential decoder 46, decoder 48, and derandomizer 50. During the first transmission from the transmitter section 110 (i.e. from t=T1 until t=T3) the WAIT signal is HIGH, the output CD of carrier detector 44 is forced to LOW (as shown in FIG. 3) and therefore the derandomizer is disabled and does not generate signals on line RXD.

Once the transmitter section 110 ceases to transmit, the WAIT signal goes LOW, permitting the carrier detector circuit 44 to search for the presence of a carrier signal. When a carrier signal is received, signal CD goes high (such as at t=T4) enabling gate 61 and thereby allowing clock signals to proceed to circuits 46, 48 and 50.

As can be seen from FIG. 2, decoder 48 generates an error signal which is used as a feed-back signal to the gain corrector circuit 42, frequency offset circuit 56, and equalizer 38. The error signal is equal to the difference between the actual QAM signal detected by the receiver and the corresponding ideal constellation point mapped on the usual complex plane. This error signal is used by the circuits to update dynamically their operational parameters. The output of the frequency offset circuit 56 is fed to the phase correction circuit 40 and the demodulator 36 as shown for the same purpose. In the present invention, this feed-back loop is controlled by a gate 58 enabled by the CD signal. In addition, the output of A/D converter 34 is fed back to the AGC 32 which uses this signal to update its taps dynamically in the normal manner. This feed back path is controlled by a second gate 59 which is also controlled by the CD signal as shown. Similarly, the output of the demodulator 36 which is used to calculate the timing offset by circuit 54 is also fed through a third gate 60 controlled by the CD signal. Therefore while CD remains low, the output of the Frequency Offset circuits, as well as the AGC, demodulator, equalizer, phase and gain correctors and timing offset circuit are locked-up or frozen so that their operational parameters remain unchanged. Thus when CD goes high again these circuits continue their operation as if no interruption has occurred.

The differential decoder 46 and derandomizer 50 are clocked by a CLOCK signal from gate 61 which combines the CD signal and a signal from the baud period timing circuit 52. When CD goes LOW, the CLOCK signal disappears, thereby locking up the derandomizer and the differential decoder.

The CD signal is also used as a disabling means to defeat circuit 26 in transmitter section 110. Any RTS signals received from DTE 400 while CD is HIGH are ignored.

Sometimes after the initial transmission, such as at t=T7, a second RTS signal may be received from the DTE 400. The operation of the modem now depends on the time interval $T_D$ (determined by TX timer 29) that occurred after the last transmission has ended (i.e. $T_D = T7 - T3$) as shown in FIG. 3. If this interval is less than a preselected interval $T_O$, then as shown in FIG. 3, the circuit 26 returns without any delay a CTS signal to DTE 400 indicating that the modem is ready for transmission. At the same time, the MARK and WAIT signals go HIGH and switch 12 is set to permit encoder 14 to receive data from randomizer 10 by timer 29.

As a result, data is transmitted without a preamble sequence. It should be appreciated that while the transmitter section was in its idle mode, some information from the previous transmission remained stored in the randomizer 10 and the differentiating encoder 16 as previously described. Therefore when the transmitter section 110 resumes its operation, these circuits can operate as if no interruption has occurred. This feature enables the modem to transmit information very fast, without the need for initializing the transmitter section prior to each transmission.

The receiver may also include a timer 70 for monitoring the time interval between the received signal streams as indicated by the CD signal.

If the receiver section receives a transmission $T_D$ seconds after a previous reception, for $T_D < T_O$, receiver circuits containing storage elements (i.e. the timing offset circuit 54, demodulator 36, equalizer 38, phase corrector 40, gain corrector 42, decoders 46, 48, derandomizer 50, frequency offset 56, timing offset 54) have been locked up, they may resume operation without any time being wasted for initialization because it is assumed that the operational parameters and data stored from the last reception are still valid.

For $T_D > T_O$, timer 70 generates a RETRAIN signal for the AGC, baud timing, equalizer and phase correction circuits for recalculating the parameters contained during the preamble in the usual manner.

The value of the time $T_D$ depends on the actual condition of channel 300. Experimentally, it was found that a good value for $T_D$ is 1.7 seconds. If $T_D$ exceeds $T_O$ then a preamble sequence may be necessary for initialization as described above.

Obviously, numerous modifications may be made to the invention without changing the scope of the invention. For example, the WAIT signal may be extended by a preselected time after RTS goes by to permit all the trailing end of the transmitted sequence to propagate through the transmitter and to permit any echo signals on the channel 300 to subside before the carrier detector circuit 44 is enabled.

What is claimed is:

1. A modem for transmitting and receiving data signals over a data channel in a half-duplex mode comprising:
   (a) a transmitter section having:
      (1) preamble means for generating preamble bits;
      (2) input means for receiving data bits in successive data streams from a data source, each data stream being separated from a succeeding data stream by a time period $T_D$;
      (3) encoding means for encoding one of said preamble bits and data bits into encoded signals;
      (4) transmitter timer means for measuring said time period $T_D$;
      (5) switch means for feeding said preamble bits to said encoding means only when a time period $T_D$ preceding a particular data stream as measured by said transmitter timer exceeds a preset level, said encoding means generating encoded preamble signals prior to generating encoded data signals corresponding to bits of said particular data stream; and
      (6) modulating means for modulating said encoded signals in signal stream corresponding to said data streams; and
   (b) a receiver section for receiving data from said channel in signal streams having:
      (1) demodulating means for demodulating received signals to generate domodulated signals;
      (2) decoding means for decoding said demodulated signals; and
      (3) receiver timing means for determining a time interval between said received signal streams, and for generating a retrain signal when said time interval exceeds said preset level for retraining said demodulator.

2. The modem of claim 1 wherein said encoding means includes a differential encoder, including at least one storage element, data bits, said storage element retaining data entered therein between data streams.

3. The modem of claim 1 wherein said transmitter section includes a randomizer, said randomizer randomizing data between data streams.

4. The modem of claim 1 wherein the receiver section includes an automatic gain controller for adjusting the gain of the received signals before demodulation which is retrained by said retrain signal.

5. The modem of claim 1 wherein said receiver section includes an equalizer for equalizing the demodulated signals, said equalizer being retrained by said retrain signal.

* * * * *